United States Patent [19]

St. Clair et al.

[11] Patent Number: 5,338,826
[45] Date of Patent: Aug. 16, 1994

[54] STRUCTURES FROM LOW DIELECTRIC POLYIMIDES

[75] Inventors: Anne K. St. Clair; Terry L. St. Clair, both of Poquoson; William P. Winfree, Williamsburg, all of Va.

[73] Assignee: The United States of America as represented by the Administrator of the National Aeronautics and Space Administation, Washington, D.C.

[21] Appl. No.: 954,108

[22] Filed: Sep. 28, 1992

Related U.S. Application Data

[63] Continuation-in-part of Ser. No. 376,482, Jul. 7, 1989, abandoned, which is a continuation-in-part of Ser. No. 73,542, Jul. 15, 1987, abandoned.

[51] Int. Cl.$^5$ .................... C08G 73/10; B05D 5/06; B32B 27/00
[52] U.S. Cl. .................... 528/353; 528/125; 528/126; 528/128; 528/170; 528/172; 528/173; 528/176; 528/183; 528/185; 528/188; 528/220; 528/229; 528/350; 428/458; 428/473.5; 427/58; 427/162; 427/165; 427/168; 264/212; 264/216
[58] Field of Search .............. 528/353, 125, 350, 126, 528/229, 128, 220, 170, 172, 173, 183, 185, 188; 428/458, 473.5; 264/212, 216; 427/58, 162, 165, 168

[56] References Cited

U.S. PATENT DOCUMENTS

| | | | |
|---|---|---|---|
| 4,111,906 | 9/1978 | Jones et al. | 528/229 |
| 4,595,548 | 6/1986 | St. Clair et al. | 528/183 |
| 4,603,061 | 7/1986 | St. Clair et al. | 428/473.5 |
| 4,645,824 | 2/1987 | Landis et al. | 528/353 |
| 4,895,972 | 1/1990 | Stoakley et al. | 528/353 |

FOREIGN PATENT DOCUMENTS

1062435 3/1967 United Kingdom .

*Primary Examiner*—John Kight, III
*Assistant Examiner*—P. Hampton-Hightower
*Attorney, Agent, or Firm*—George F. Helfrich

[57] ABSTRACT

A structure which is effective as an electrical insulator or as a transmitter-receiver of electromagnetic energy is prepared by providing a suitable substrate and covering the substrate with an adhering layer of a low dielectric, high temperature, linear aromatic polyimide. This polyimide is prepared by:

(1) selecting aromatic diamine and aromatic dianhydride reactants to meet at least two of the following three conditions:
 (a) a reactant must have minimal permanent or inducible electrical dipolar characteristics as a result of the presence of pendant or bridging groups therein;
 (b) a reactant must impart a high degree of free volume to the polymer caused by inefficient chain packing therein in the solid state as a result of the presence of pendant or bridging groups therein; and
 (c) a reactant must have fluorine atoms chemically attached thereto; and (2) chemically combining equimolar quantities of the aromatic diamine and aromatic dianhydride reactants in a solvent to form a high molecular weight polyamic acid solution, and converting the high molecular weight polyamic acid to the corresponding low dielectric, high temperature linear aromatic polyimide.

15 Claims, No Drawings

STRUCTURES FROM LOW DIELECTRIC POLYIMIDES

ORIGIN OF THE INVENTION

The invention described herein was made by employees of the United States Government and may be manufactured and used by or for the Government for governmental purposes without the payment of any royalties thereon or therefor.

This application is a continuation-in-part of copending application serial number 07/376,482 filed Jul. 7, 1989, now abandoned which is a continuation-in-part of application Ser. No. 07/073,542 filed Jul. 15, 1987, now abandoned.

BACKGROUND OF THE INVENTION

1. Field of the Invention

The present invention relates generally to electrical insulators and to electromagnetic energy transmitters and receivers. Particularly, it relates to a process for preparing a structure which is effective as an electrical insulator or as a transmitter-receiver for electromagnetic energy.

2. Description of the Related Art

High performance polymers are being used increasingly by the electronic circuit industry. As cited by Senturia (*Proc. of ACS Polym. Matls. Sci. and Eng.*, Vol. 55, 385,1986), there are four primary applications in the area of microelectronics: (1) as fabrication aids such as photoresists, planarization layers, and ion implant masks; (2) as passivant overcoats and interlevel insulators; (3) as adhesives, and (4) as substrate components. Of utmost importance for the performance of a polymer used for electronic applications is its electrical behavior. To be useful, particularly as a passivant or protective overcoat, the material must be an excellent insulator.

High performance polymers should also find applications on aircraft and spacecraft where structures are needed to efficiently transmit and receive electromagnetic energy, as in radomes, microwave reflectors, waveguides, and the like. Moreover, a need exists in commercial communications for a structure which can be used to efficiently transmit telephonic, radio, and television signals.

U.S. Pat. No. 4,111,906 (Jones et al.) is directed to a novel aromatic diamine and the use of this diamine in the preparation of polymeric materials including polyimides. However, this reference is not concerned with the preparation of a structure which is effective as an electrical insulator or as a transmitter-receiver of electromagnetic energy. Nor is it concerned with the preparation of polymers having low dielectric constants.

U.S. Pat. No. 4,645,824 (Landis et al.)is directed to a solvent polycondensation process for preparing high molecular weight polyimides from dianhydrides and diamines. However, this reference is not concerned with the preparation of a structure which is effective as an electrical insulator or as a transmitter-receiver of electromagnetic energy. Nor is it concerned with the preparation of polymers having low dielectric constants.

Great Britain 1,062,435 is directed to the preparation of polyimides which are useful in the preparation of shaped structures such as films, fibers, filaments, foams, and the like. Like Jones and Landis discussed above, this references does not even mention the dielectric constant of the polyimides, and is not at all concerned with the preparation of structures which are effective as electrical insulators or as transmitter-receivers of electromagnetic energy.

The dielectric constant of commercially available polyimides presently used as state-of-the-art materials for passivants and interlevel dielectrics ranges from approximately 3.2 to 4.0 (depending on frequency and moisture content). The lower limit of 3.2 is obtained on commercial polyimide film DuPont Kapton ® H film only after being fully desiccated. Unfortunately, as the film or coating absorbs moisture, the dielectric constant rises, making measurements and operation of electronic devices complicated.

Accordingly, it is a primary object of the present invention to provide what is not available from the teachings of the prior art, viz., a process for preparing a structure which is effective as an electrical insulator and/or as a transmitter-receiver for electromagnetic energy.

Another object of the present invention is the provision of a process for preparing low dielectric, high temperature, linear aromatic polyimides for use in preparing the above structures.

SUMMARY OF THE INVENTION

According to the present invention, these objects and the attending benefits are achieved by:

(A) providing a suitable substrate, i.e., a solid article upon the surface of which a coating, layer, or film may be deposited; and (B) covering the substrate with an adhering layer of a low-dielectric, high-temperature, linear, aromatic polyimide prepared by the following process:
  (1) selecting aromatic diamine and aromatic dianhydride reactants to meet at least two of the following three conditions:
    (a) a reactant must have minimal permanent or inducible electrical dipolar characteristics as a result of the presence of pendant or bridging groups therein;
    (b) a reactant must impart a high degree of free volume to the polymer caused by inefficient chain packing therein in the solid state as a result of the presence of pendant or bridging groups therein; and
    (c) a reactant must have fluorine atoms chemically attached thereto; and
  (2) chemically combining equimolar quantities of the aromatic diamine and aromatic dianhydride reactants in a solvent to form a high molecular weight polyamic acid solution, and converting the high molecular weight polyamic acid to the corresponding low dielectric, high temperature linear aromatic polyimide.

According to one embodiment of the present invention, the high molecular weight polyamic acid solution is applied onto the surface of the substrate to form a polyamic acid film layer, and the applied polyamic acid film layer is then thermally cured to form a low dielectric, high temperature linear aromatic polyimide film layer which adheres to the substrate.

According to another embodiment of the present invention, the high molecular weight polyamic acid solution is chemically imidized to produce a precipitate of the corresponding polyimide; the corresponding polyimide is then dissolved in a solvent, and a film layer prepared from the solution of the polyimide in the solvent is applied onto the surface of the substrate; and the film layer is subsequently heated to remove solvent and produce a high temperature stable, low dielectric polyimide film layer which adheres to the substrate.

By the present invention, substrates are covered with aromatic condensation polyimide films and coatings which have dielectric constants in the range of 2.4 to 3.2. These materials are better electrical insulators than state-of-the-art commercial polyimides, and the resulting structure is a very efficient insulator and/or a very efficient transmitter/receiver of electromagnetic energy.

The process for producing the highly insulative (low dielectric) aromatic polyimides according to the present invention requires at least 2 of the following 3 conditions:

(1) Selecting aromatic diamine and aromatic dianhydride reactants which have minimal permanent or inducible electrical dipolar characteristics; (2) Selecting aromatic diamine and aromatic dianhydride reactants which impart a high degree of free volume to the resulting polymer as a result of inefficient chain packing in the solid state. This is enhanced when ortho or meta linkages are employed along the backbone of the polymer, when flexible bridging units are incorporated, and/or when pendant units are incorporated along the backbone to break up symmetry; and (3) Incorporating fluorine atoms in the molecular structure of the polymer, as by employing —$CF_3$ groups in the aromatic diamine or aromatic dianhydride reactants.

DETAILED DESCRIPTION OF THE PREFERRED EMBODIMENTS

Preparation of low dielectric polyimide films and coatings to cover substrates according to the present invention involves the conventional reaction of an aromatic diamine in a solvent with an aromatic dianhydride according to the following:

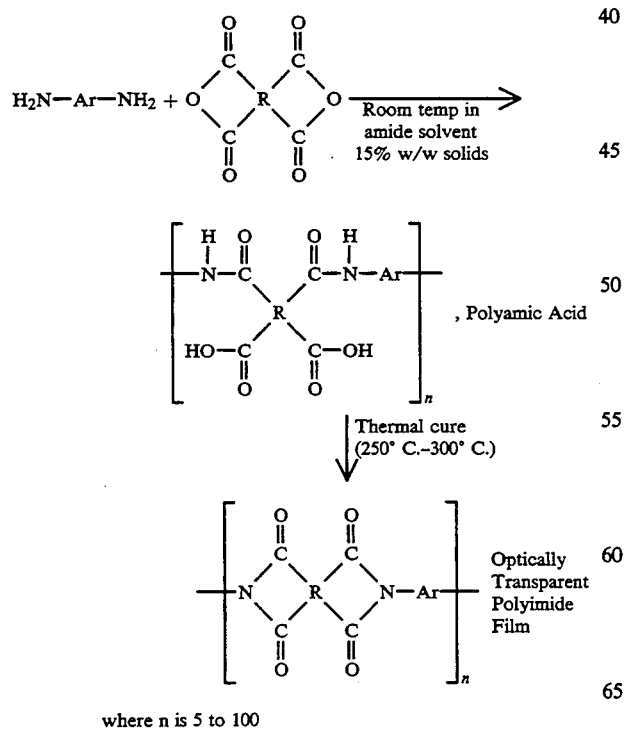

where n is 5 to 100 where R is

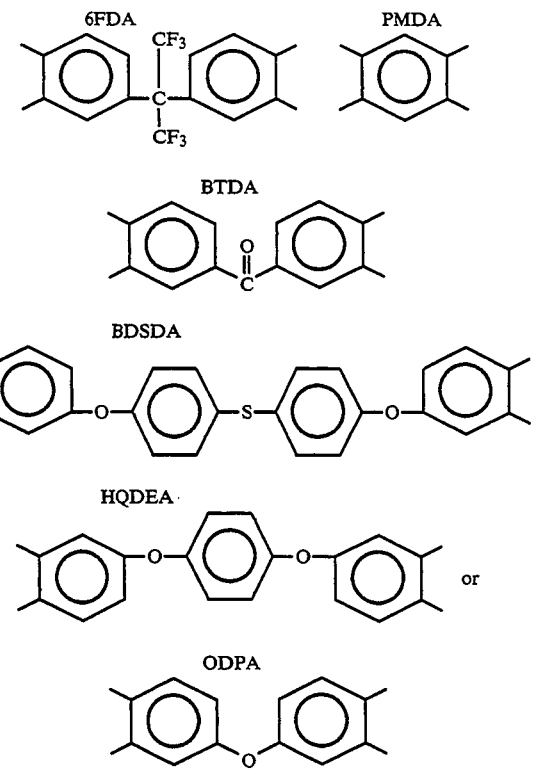

and where Ar is

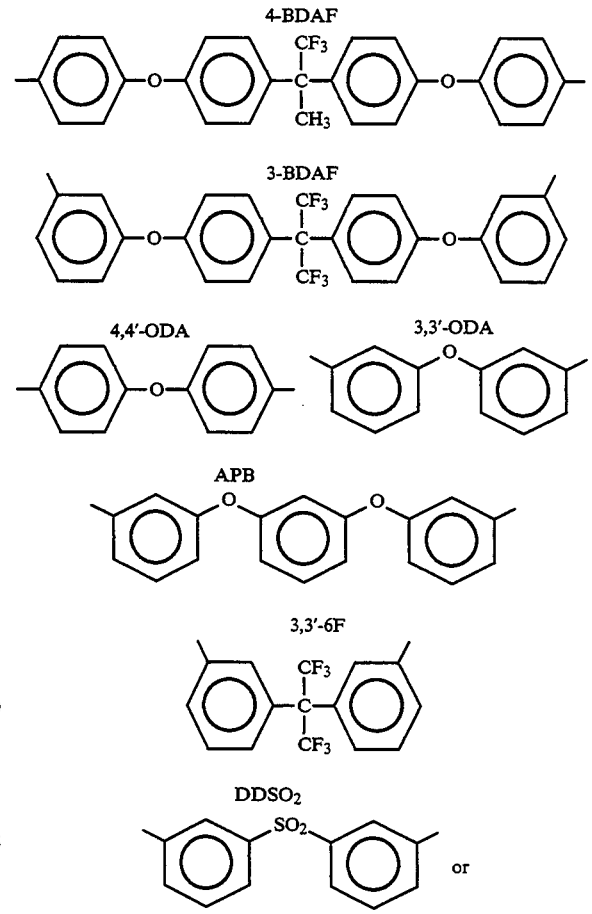

-continued 4,4'-6F

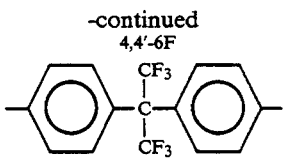

In the above reaction, a polymer grade aromatic diamine is dissolved in a dry amide type solvent such as dimethylacetamide (DMAc). A polymer grade aromatic dianhydride is then added to the diamine solution at room temperature to form a polyamic acid. This resin is then spread onto a substrate to form a film using a doctor blade with specified blade gap. The polyamic acid film covering the substrate is then thermally converted to a polyimide by heating preferably to 250°–300° C.

Another method for preparing a low dielectric polyimide film or coating for covering substrates according to the present invention is to dissolve polyimide powder in a solvent and use this solution for film-casting or for spray-coating. The polyimide powder is prepared by chemically imidizing the polyamic acid in solution (preparation of the polyamic acid is described above). The polyimide is then precipitated by pouring the imidized polymer dissolved in amide solvent into a rapidly stirred non-solvent such as water. The resulting polyimide powder can then be dried and stored indefinitely. When ready for application to a substrate, the polyimide powder is redissolved in a solvent of choice and either cast into a film or spray-coated onto a suitable substrate to prepare a structure which is very effective as an electrical insulator or as a transmitter-receiver of electromagnetic energy.

The reduction of the dielectric constant of the polymer accomplished by increasing free volume contributions of the dianhydride is illustrated in Table I.

TABLE I
DIELECTRIC PROPERTIES OF POLYMERS CONTAINING OXYDIALINE (ODA)

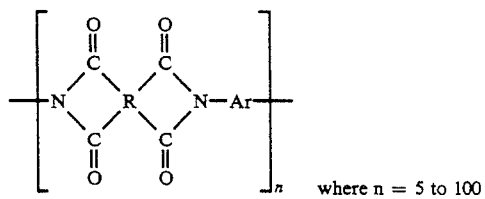

where n = 5 to 100

| POLYMER[a] | DIANHYDRIDE R | DIAMINE Ar | DIELECTRIC CONSTANT at 10 GHz[b] |
|---|---|---|---|
| PMDA + 4,4'-ODA (KAPTON ®) | | | 3.22(3.25)[c] |
| PMDA + 3,3'-ODA | | | 2.84 |
| BTDA + 4,4'-ODA | | | 3.15 |
| BTDA + 3,3'-ODA | | | 3.09 |
| ODPA + 4,4'-ODA | | | 3.07 |
| ODPA + 3,3'-ODA | | | 2.99 |
| HQDEA + 4,4'-ODA | | | 3.02 |
| HQDEA + 3,3'-ODA | | | 2.88 |
| BDSDA + 4,4'-ODA | | | 2.97 |
| BDSDA + 3,3'-ODA | | | 2.95 |

TABLE I-continued
DIELECTRIC PROPERTIES OF POLYMERS CONTAINING OXYDIALINE (ODA)

Structure: [-N(CO)₂-R-(CO)₂N-Ar-]$_n$ where n = 5 to 100

| POLYMER[a] | DIANHYDRIDE R | DIAMINE Ar | DIELECTRIC CONSTANT at 10 GHz[b] |
|---|---|---|---|
| 6FDA + 4,4'-ODA | (C(CF₃)₂ bridged bis-phthalic anhydride) | 4,4'-diphenyl ether | 2.79 |
| 6FDA + 3,3'-ODA | (C(CF₃)₂ bridged bis-phthalic anhydride) | 3,3'-diphenyl ether | 2.73 |

[a]Films were dessicated prior to testing
[b]Measurements were made at room temperature and approximately 25% relative humidity
[c]Value in parentheses was obtained on commercial Kapton ® H Film The dielectric constants were measured at 10 GHz at room temperature and approximately 35% relative humidity. Commercial Kapton® H film which is prepared from PMDA and 4,4'-ODA (chemical structure shown in Table I) was used as a basis for comparison as it is widely used by the electronics industry as a film and coming material for substrates. Incorporation of a bridging group or atom between two phenyl groups in the dianhydrides BTDA and ODPA reduces the acidity of these dianhydrides relative to PMDA, causing a reduction in Lewis acid-base interactions between chains, thereby enhancing the free volume. The dielectric constants of 3.15 for BTDA+4,4'-ODA and 3.07 for ODPA+4,4'-ODA are lower than for PMDA+4,4'-ODA (3.22) prepared in this laboratory or commercial Kapton ® (3.25), which is reported to have a high degree of Lewis acid-base interaction between chains. The addition of another phenoxy group to the dianhydride lowers the dielectric constant of HQDEA+4,4'-ODA even further (3.02). Incorporation of both —O— and —S— between phenyl rings lowers the dielectric constant still further as in the case of BDSDA+4,4'-ODA (2.97). Although the above mentioned —O— and —S— atoms and —C=O group were used to separate charge and reduce the acidity of the dianhydride in the present invention, other groups could foreseeably be employed.

Incorporation of physical "kinks" or dissymmetry into the polymer chain to reduce interactions and inhibit packing between chains and lower the dielectric constant is also illustrated in Table I. The many examples of polymers prepared with ODA in this table show that incorporation of meta-oriented (3,3'-) diamines into the molecular structure causes a reduction in the dielectric constant. Similar results are shown in Table II where the last polymer in the table, 6FDA+3-BDAF, prepared with a meta-oriented diamine displays a dielectric constant of 2.40 compared to 2.50 for its more conventional para-oriented counterpart.

TABLE II
DIELECTRIC PROPERTIES OF POLYMERS PREPARED FROM BDAF DIAMINES

Structure: [-N(CO)₂-R-(CO)₂N-C₆H₄-O-C₆H₄-C(CF₃)₂-C₆H₄-O-C₆H₄-]$_n$ where n = 5-100

| POLYMER | DIANHDRIDE R | DIELECTRIC CONSTANT at 10 GHz |
|---|---|---|
| PMDA + 4-BDAF[a] | (benzene) | 2.63 |
| BTDA + 4-BDAF | (benzophenone) | 2.74 |

TABLE II-continued
DIELECTRIC PROPERTIES OF POLYMERS PREPARED FROM BDAF DIAMINES

[Structural formula of polymer with dianhydride R group, diamine with ether linkages, and -C(CF$_3$)$_2$- bridge, repeating unit n = 5-100]

| POLYMER | DIANHDRIDE R | DIELECTRIC CONSTANT at 10 GHz |
|---|---|---|
| ODPA + 4-BDAF | [diphenyl ether structure] | 2.68 |
| ODPA + 3-BDAF[b] | [diphenyl ether structure] | 2.70 |
| BDSDA + 4-BDAF | [bis(phenoxyphenyl)sulfide structure] | 2.69 |
| HQDEA + 4-BDAF | [hydroquinone bis(phenyl ether) structure] | 2.56 |
| 6FDA + 4-BDAF | [bis(phenyl)hexafluoropropane structure] | 2.50 |
| 6FDA + 3-BDAF[b] | [bis(phenyl)hexafluoropropane structure] | 2.40 |

[a]4-BDAF designates both amine groups attached in the para position
[b]3-BDAF designates both amine groups attached in the meta position Although ODA and BDAF were used in the specific examples of the present invention to show the effect of meta-orientation upon polyimide dielectric constant, other ortho or meta-oriented diamines could foreseeably produce the same results when compared to their all para-oriented (4,4'-) counterparts. Although meta isomerism was used in the present invention to produce structural "kinks" or dissymmetry in the polymer chain and thus lower the dielectric constant of the resulting polyimide, other forms of isomerism could foreseeably produce similar results. Other forms of isomerism in the aromatic diamine might include any combination of ortho, metal or para isomerism so as to reduce symmetry and increase free volume between chains.

Interactions between polymer chains are also reduced by incorporation of pendent groups along the backbone of the polyimide which sterically hinder polymer chain packing. Pendant groups used in the present invention are —CF$_3$ groups in the form of —C(CF$_3$)$_2$. It is evident in Tables I, II and III that incorporation of such a group in the dianhydride and/or diamine produces polymers with relatively low dielectric constants. However, the pendant groups used in the present invention also contain fluorine atoms which satisfy the third condition cited previously for preparing a low dielectric polyimide. Table III lists the dielectric constants for a series of polymers prepared from 6FDA containing the pendant fluorinated —C(CF$_3$)$_2$ group. The dielectric constant is at a minimum when —CF$_3$ groups are placed in both the dianhydride and diamine portions of the polymer.

TABLE III
DIELECTRIC PROPERTIES OF POLYMERS PREPARED FROM GFDA DIANHYDRIDE

[Structure: polyimide with $CF_3$ groups, $-\!-\!N\!-\!Ar\!-\!-$] WHERE N = 5 TO 100

| POLYMER | DIAMINE AR | DIELECTRIC CONSTANT AT 10 GHz |
|---|---|---|
| 6FDA + DDSO$_2$ | [two phenyl rings linked by $SO_2$] | 2.86 |
| 6FDA + 4,4'-ODA | [two phenyl rings linked by O] | 2.79 |
| 6FDA + 3,3'-ODA | [two phenyl rings linked by O, meta] | 2.73 |
| 6FDA + APB | [three phenyl rings linked by O, O] | 2.67 |
| 6FDA + 4-BDAF | [four phenyl rings with O, $C(CF_3)_2$, O linkages] | 2.50 |
| 6FDA + 3-BDAF | [four phenyl rings with O, $C(CF_3)_2$, O linkages, meta] | 2.40 |
| 6FDA + 4,4'-6F | [two phenyl rings linked by $C(CF_3)_2$] | 2.39 |

The incorporation of bulky groups such as —$CF_3$ or —$SO_2$ into a linear aromatic polyimide to reduce electronic interactions between chains has been previously reported by St. Clair and St. Clair (U.S. Pat. No. 4,603,061). This method was used to reduce charge transfer between chains and thereby produce optically transparent films. The most optically transparent or colorless film produced according to this patent was prepared by 6F (herein referred to as 6FDA) and DDSO$_2$. Although the use of the bulky —$SO_2$ group was entirely successful at reducing charge transfer between chains to the extent of producing a water-white/colorless film, it has not been equally successful at lowering the dielectric constant, because this type of group has a dipolar character which enhances some forms of chain-chain interactions that are not of a charge transfer type. Therefore, with an —$SO_2$ unit, color can be low, but the dielectric constant remains high.

It is not, therefore, obvious to those skilled in the art, that reduction of electronic interactions between chains by incorporation of bulky groups as taught by St. Clair and St. Clair in the above-stated patent should lower the dielectric constant or make a polyimide more insulative based on the fact that this procedure produced aromatic polyimides with improved transparency. It is shown in the present invention that for enhanced insulative capacity, the aromatic polyimide can contain fluorine atoms in the polymer backbone. For example, as shown in Table IV substitution of a bulky —$SO_2$ group for —O— in the aromatic ODA diamine of Kapton ® reduces chain-chain interaction making the PMDA+DDSO2 polymers more transparent (pale orange). The dielectric constant remains equal to that of the Kapton ®, however.

TABLE IV
PROPERTIES OF POLYIMIDE FILM

| POLYMER | DIANHYDRIDE R | DIAMINE Ar | FILM COLOR (0.5 mil film) | UV CUT-OFF nm (0.2 mil film) | DIELECTRIC CONSTANT 10 GHz |
|---|---|---|---|---|---|
| KAPTON ® | | | YELLOW | 450 | 3.25 |
| PMDA + DDSO$_2$ | | | PALE ORANGE | 360 | 3.26 |
| 6FDA + DDSO$_2$ | | | COLORLESS | 312 | 2.86 |
| PMDA + 4-BDAF | | | YELLOW | 340 | 2.63 |
| 6FDA + 4-BDAF | | | PALE YELLOW | 328 | 2.50 |

Incorporation of the 6FDA fluorine-containing dianhydride into the polymer to replace PMDA lowers the dielectric constant to 2.86. Substitution of 4-BDAF for ODA in the Kapton ® polymer produces a significant lowering of the dielectric constant to 2.63. When both monomers contain —$CF_3$— groups the dielectric constant is at a minimum (2.4 to 2.5).

The method of the present invention for lowering the dielectric constant of an aromatic polyimide is to combine two or more of the following three conditions: (1) minimal permanent or inducible dipolar characteristics for units along the polymer chain; (2) maximal use of linkages or groups which result in inefficient polymer chain packing to create higher levels of free volume in the polymer; and (3) selecting aromatic diamine or aromatic dianhydride reactants which contain fluorine atoms. The best example of this success herein is that of 6FDA +3-BDAF. This polymer has a minimal dielectric constant of 2.40 at 10 GHz. Both monomers contain fluorine atoms. Dipolar interactions between polymer chains should be at a minimum due to —O— separator atoms in the BDAF diamine, meta isomerism in the 3-BDAF diamine, and further steric hindrance to chain packing due to pendant —$CF_3$ units in both monomers. The presence of organofluorine moieties accordingly serves two purposes in the $CF_3$-containing polymers.

The incorporation of the —$CF_3$ fluorinated alkyl groups into polyimides according to this invention produces low dielectric materials which show unusually excellent resistance to moisture, exhibiting properties approaching those of polytetrafluoroethylene. As stated earlier, Kapton ® commercial polyimide film absorbs moisture causing the dielectric constant thereof to increase. As shown in Table V, the dielectric constant of Kapton ® at 1 MHz rose from 3.38 at 30–35% RH to 3.85 at 100% RH (an increase of approximately 14%). The dielectric constants of polymers of the present invention containing —$CF_3$ groups, however, were significantly more stable when the films were subjected to increasing humidity. The dielectric constant of 6FDA+4-BDAF changed only 1% upon subjection to 100% humidity.

Dielectric constants at 100% RH for all films were measured after soaking the films in distilled water for 24 hours.

TABLE V

| DIELECTRIC PROPERTIES OF POLYIMIDE FILMS MEASURED AT VARIOUS RELATIVE HUMIDITIES (RH) | | | |
|---|---|---|---|
| | DIELECTRIC CONSTANT AT 1 MHz | | |
| POLYMER | 30–35% RH | 47–50% RH | 100% RH |
| Kapton ® | 3.38 | 3.44 | 3.85 |
| 6FDA + 4-BDAF | 2.77 | 2.81 | 2.80 |
| ODPA + 4-BDAF | 3.08 | 3.12 | 3.17 |
| PMDA + 4-BDAF | 2.93 | 2.97 | 3.01 |
| BTDA + 4-BDAF | 3.03 | 3.09 | 3.15 |
| BDSDA + 4-BDAF | 3.08 | 3.14 | 3.16 |

The linear aromatic polyimides used herein all contain the five-membered imide group

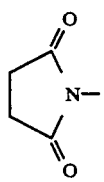

and are therefore so-designated as polyimides. The "imide" portion of these systems, however, is not considered to contribute to lowering the polymer dielectric constant by the teachings of the present invention. By the doctrine herein, two or more of the following three conditions must be met to produce a low dielectric aromatic polymer:(1) selecting monomers which have minimal permanent or inducible electrical dipolar characteristics such as those containing pendant or bridging groups; (2) selecting monomers which impart a high degree of free volume to the resulting polymer; and (3) selecting monomers having fluorine atoms chemically attached. Therefore, the dielectric constant of any aromatic polymer, and indeed, any polymer, could foreseeably be lowered by using this process. When all three of the above conditions are satisfied, the dielectric constant of the aromatic polymer is minimized.

The polyimides described above may be applied to a wide variety of substrates to produce structures which are very effective as electrical insulators or as efficient transmitter-receivers of electromagnetic energy. These substrates include: glass, polymeric composites, molded polymer structures or polymer films, and metallic surfaces. Moreover, the polyimides may be used to prepare composite laminates which have the same utility. Details are supplied in the Specific Examples which follow.

SPECIFIC EXAMPLES

Example I

To a dry vessel was added 1.0369 g of polymer grade (recrystallized) 2,2-bis[4(4-aminophenoxy)phenyl]-hexafluoropropane (4-BDAF)(m.pt. 162° C.) and 10.9 g dry dimethylacetamide (DMAc). After the diamine had dissolved, 0.8885 g of polymer grade (recrystallized) 2,2-bis(3,4-dicarboxyphenyl)hexafluoropropane dianhydride (6FDA)(m.pt. 241° C.) was added at once to the stirred diamine/DMAc mixture. Stirring was continued until all dianhydride had dissolved and a solution inherent viscosity of 1.0 dl/g at 35° C. was obtained. The resulting polyamic acid solution (15% solids by weight) was refrigerated until used for film casting.

A film of the 6FDA+4-BDAF polyamic acid was cast onto a substrate, e.g., a soda-lime glass substrate, in a dust-free chamber at a relative humidity of 10%. The solution was spread by an aluminum blade with the gap set so as to ensure a final film thickness of 1.0 mil. The polyamic acid film covering the substrate was thermally converted to the corresponding polyimide by heating in a forced air oven for one hour each at 100°, 200°, and 300° C. The dielectric constant of this film measured under ambient conditions was 2.77 at 1 MHz and 2.50 at 10 GHz. The film was found to be essentially resistant to moisture. The dielectric constant of 6FDA+4-BDAF was found to vary no more than 1% after the film was soaked for 24 hours in distilled water.

Film covered substrates such as this possess excellent insulative properties, rendering them highly suitable for applications in the areas of electronics and microelectronics. In addition, many of the film covered substrates are also very effective when used in the transmission and reception of electromagnetic energy.

Example II

Using the same method and conditions as in Example I of the present invention, equimolar amounts of 2,2-bis[4(3-aminophenoxy)phenyl]hexafluoropropane (3-

BDAF)(m.pt. 133° C.) and 6FDA were dissolved in DMAc to form a polyamic acid resin having an inherent viscosity of 0.90 dl/g. The resulting 6FDA+3-BDAF polyimide film had a dielectric constant of 2.40 at 10 GHz. Like that of the 6FDA+4-BDAF film of Example I, the dielectric constant of 6FDA+3-BDAF changed very little when the film was exposed to 100% relative humidity.

Example III

By the same method and conditions described in Example I of the present invention, equimolar amounts of 1,3-bis(aminophenoxy)benzene(APB)(m.pt. 105° C.) and 6FDA were dissolved in DMAc to form a polyamic acid having an inherent viscosity of 1.20 dl/g. The resulting 6FDA +APB polyimide film had a dielectric constant of 2.67 at 10 GHz and 3.15 at 1 MHz. After the film was soaked for 24 hours in distilled water, the dielectric constant thereof was unchanged. The film appeared to be essentially unaffected by moisture.

Example IV

By the same method and conditions described in Example I of the present invention, equimolar amounts of 4,4'-oxydianiline (4,4'-ODA)(m.pt. 188° C.) and 6FDA were dissolved in DMAc to form a polyamic acid having an inherent viscosity of 1.0 dl/g. The resulting polyimide film had a dielectric constant of 2.79 at 10 GHz.

Example V

By the same method and conditions described in Example I of the present invention, equimolar amounts of 2,2-bis(4-aminophenyl)hexafluoropropane (4,4'-6F)(m.pt. 194° C.) and 6FDA were dissolved in DMAc to form a polyamic acid having an inherent viscosity to 1.0 dl/g. The resulting polyimide had a dielectric constant of 2.39 at 10 GHz.

Example VI

By the same method and conditions described in Example I of the present invention, equimolar amounts of 3,3'-oxydianiline (3,3'-ODA)(m.pt. 78° C.) and 6FDA were dissolved in DMAc to form a polyamic acid having an inherent viscosity of 1.0 dl/g. The resulting polyimide film had a dielectric constant of 2.73 at 10 GHz and 2.96 at 1 MHz. After the film was soaked for 24 hours in distilled water, the dielectric constant thereof increased by 7%.

Example VII

By the same method and conditions described in Example I of the present invention, equimolar amounts of 2,2-bis(3-aminophenyl)hexafluoropropane (3,3'-6F)(m.pt. 79° C.) and 6FDA were dissolved in DMAc to form a polyamic acid having an inherent viscosity of 0.60 dl/g. The resulting polyimide film had a dielectric constant of 2.50 at 10 GHz.

Example VIII

By the same method and conditions described in Example I of the present invention, equimolar amounts of 4-BDAF and pyromellitic dianhydride (PMDA)(m.pt. 285° C.) were dissolved in DMAc to form a polyamic acid having an inherent viscosity of 0.5 dl/g. The resulting polyimide film had a dielectric constant of 2.63 at 10 GHz and 2.93 at 1 MHz. After the film was soaked for 24 hours in distilled water, the dielectric constant of this polymer varied 2–3%.

Example IX

By the same method and conditions described in Example I of the present invention, equimolar amounts of 4-BDAF and 3,3'4,4'-benzophenone tetracarboxylic dianhydride(BTDA)(m.pt. 222° C.) were dissolved in DMAc to form a polyamic acid having an inherent viscosity of 0.94 dl/g. The resulting polyimide film had a dielectric constant of 2.74 at 10 GHz and 3.03 at 1 MHz. After the film was soaked for 24 hrs. in distilled water, the dielectric constant of this polymer varied only 3–4%.

Example X

By the same method and conditions described in Example I of the present invention, equimolar amounts of 4-BDAF and 4,4'-oxydiphthalic anhydride (ODPA)(m.pt. 224° C.) were dissolved in DMAc to form a polyamic acid having an inherent viscosity of 1.08 dl/g. The resulting polyimide film had a dielectric constant of 2.68 at 10 GHz and 3.08 at 1 MHz. After the film was soaked for 24 hours in distilled water the dielectric constant of this polymer varied only 2–3%.

Example XI

By the same method and conditions described in Example I of the present invention, equimolar amounts of 4-BDAF and 4,4'-bis(3,4-dicarboxyphenoxy)diphenyl sulfide dianhydride (BDSDA) (m.p.t 189°–190° C.) were dissolved in DMAc to form a polyamic acid having an inherent viscosity of 1.10 dl/g. The resulting polyimide film had a dielectric constant of 2.69 at 10 GHz and 3.08 at 1 MHz. After the film was soaked for 24 hours in distilled water the dielectric constant of this polymer varied only 2–3%.

Example XII

By the same method and conditions described in Example I of the present invention, equimolar amounts of 4-BDAF and 1,4-bis(3,4-dicarboxyphenoxy)benzene dianhydride (HQDEA)(m.pt. 262°–263° C.) were dissolved in DMAc to form a polyamic acid having an inherent viscosity of 1.0 dl/g. The resulting polyimide film had a dielectric constant of 2.56 at 10 GHz.

Example XIII

By the same method and conditions described in Example I of the present invention, equimolar amounts of PMDA (Example VIII) and 3,3'-ODA (Example VI) were dissolved in DMAc to form a polyamic acid having an inherent viscosity of 1.18 dl/g. The resulting polyimide film had a dielectric constant of 2.84 at 10 GHz.

Example XIV

By the same method and conditions described in Example I of the present invention, equimolar amounts of BTDA (Example IX) and 3,3'ODA (Example VI) were dissolved in DMAc to form a polyamic acid having an inherent viscosity of 1.09 dl/g. The resulting polyimide film had a dielectric constant of 3.09 at 10 GHz.

Example XV

By the same method and conditions described in Example I of the present invention, equimolar amounts of ODPA (Example X) and 4,4'-ODA (Example IV) were dissolved in DMAc to form a polyamic acid having an inherent viscosity of 1.23 dl/g. The resulting polyimide film had a dielectric constant of 3.07 at 10 GHz.

Example XVI

By the same method and conditions described in Example I of the present invention, equimolar amounts of ODPA (Example X) and 3,3'-ODA (Example VI) were dissolved in DMAc to form a polyamic acid having an inherent viscosity of 0.67 dl/g. The resulting polyimide film had a dielectric constant of 2.99 at 10 GHz.

Example XVI

By the same method and conditions described in Example I of the present invention, equimolar amounts of HQDEA (Example XII) and 4 4'-ODA (Example IV) were dissolved in DMAc to form a polyamic acid having an inherent viscosity of 0.70 dl/g. The resulting polyimide film had a dielectric constant of 3.02 at 10 GHz.

Example XVI

By the same method and conditions described in Example I of the present invention, equimolar amounts of HQDEA (Example XII) and 3,3'-ODA (Example VI) were dissolved in DMAc to form a polyamic acid having an inherent viscosity of 0.42 dl/g. The resulting polyimide film had a dielectric constant of 2.88 at 10 GHz.

Example XIX

By the same method and conditions described in Example I of the present invention, equimolar amounts of BDSDA (Example XI) and 4,4'-ODA (Example IV) were dissolved in DMAc to form a polyamic acid having an inherent viscosity of 0.78 dl/g. The resulting polyimide film had a dielectric constant of 2.97 at 10 GHz.

Example XX

By the same method and conditions described in Example I of the present invention, equimolar amounts of BDSDA (Example XI) and 3,3'-ODA (Example VI) were dissolved in DMAc to form a polyamic acid having an inherent viscosity of 0.40 dl/g. The resulting polyimide film had a dielectric constant of 2.95 at 10 GHz.

Example XXI

By the same method and conditions described in Example I of the present invention, equimolar amounts of BDSDA (Example XI) and APB (Example III) were dissolved in DMAc to form a polyamic acid having an inherent viscosity of 0.41 dl/g. The resulting polyimide film had a dielectric constant of 2.89 at 10 GHz and 3.06 at 1 MHz.

Example XXI

By the same method and conditions described in Example I of the present invention, equimolar amounts of ODPA (Example X) and APB (Example III) were dissolved in DMAc to form a polyamic acid having an inherent viscosity of 0.87 dl/g. The resulting polyimide film had a dielectric 115 constant of 2.79 at 10 GHz.

Example XXIII

By the same method and conditions described in Example I of the present invention, equimolar amounts of ODPA (Example X) and 3-BDAF (Example II) were dissolved in DMAc to form a polyamic acid having an inherent viscosity of 0.54 dl/g. The resulting polyimide film had a dielectric constant of 2.70 at 10 GHz and 3.09 at 1 MHz.

Example XXIV

By the same method and conditions described in Example I of the present invention, equimolar amounts of 3,3'-diaminodiphenylsulfone ($DDSO_2$)(m.pt. 172° C.) and 6FDA were dissolved in DMAc to form a polyamic acid resin having an inherent viscosity of 0.5 dl/g. The resulting 6FDA+$DDSO_2$film had a dielectric constant of 2.86 at 10 GHz.

Example XXIX

By the same method and conditions described in Example VI of the present invention, a viscous polyamic acid resin of 6FDA+3,3'-ODA was prepared. An imide powder of this formulation was prepared by chemically imidizing the polyamic acid using pyridine/acetic anhydride as is well known in the art. The powder was precipitated by pouring the imidized polymer/DMAc solution into rapidly stirred distilled water. The resulting white powder was dried at 60° C. for 4 hours and at 200° C. for two hours. The 6FDA+3,3'-ODA polyimide powder was dissolved in chloroform, and a film prepared according to the procedure described in Example I. The resulting film was flexible and tough and had a dielectric constant of 2.74 at 10 GHz.

Example XXX

By the same method and conditions described in Example I of the present invention, a viscous polyamic acid resin of 6FDA+4-BDAF was prepared; and an imide powder of this formulation was prepared according to the method described in Example XXIX. A film was prepared according to the procedure described in Example I by casting a solution of the 6F+4BDAF powder dissolved in chloroform. The resulting film was of good quality and had a dielectric constant of 2.55 at 10 GHz.

Example XXXI

By the same method and conditions described in Example I of the present application, a viscous polyamic acid resin of 6FDA+4-BDAF was prepared containing 23–30% solids (w/w) in DMAc having an inherent viscosity ranging from 0.96 to 1.23 dl/g. The polyamic acid resin was applied to S-2 glass fiber tow on a drum winder using a drum rotation of 1 rpm, a transverse rate of 16% full speed with minimum applied fiber tension and a die gap of 0.11"×0.03". The resulting prepreg (resin impregnated fiber) was dried until tack-free under infrared lamps. It was then removed from the drum and cut into 1 -ft. long sections and B-staged in a forced air oven at 190° C.

Unidirectional and cross-ply composite laminates were prepared in 3"×3"stainless molds from the 6FDA+4-BDAF/glass fiber prepreg and were processed as follows: (1) Temperature was ramped from ambient to 350° C., (2) 300 psi pressure was applied to the consolidated laminate when the temperature reached 252° C. and this pressure was held for the entire processing time, and (3) after holding temperature (350° C.) and pressure (300 psi) for one hour the laminates were cooled to room temperature under pressure. Mechanical properties of the various composites are displayed in Table VI. Dielectric constants of the resulting 6FDA+4-BDAF/S-2 glass composites ranged from 3.8 to 4.0 at 10 GHz.

These composites, in addition to possessing excellent electrical insulative properties, find utility in the fabrication of structures which exhibit excellent transmission/reception of electromagnetic energy, as in radomes, microwave reflectors, waveguides, and the like.

The foregoing specific Examples are exemplary and are not to be considered as exhaustive, but merely to illustrate the invention without serving as limitations thereon.

We claim:

1. A process for preparing a structure which is effective as an electrical insulator or as a transmitter-receiver of electromagnetic energy, the process comprising:
   (A) providing a suitable substrate; and
   (B) covering the substrate with an adhering layer of a low-dielectric, high-temperature, linear, aromatic polyimide prepared by a process which comprises:
      (1) selecting aromatic diamine and aromatic dianhydride reactants to meet at least two of the following three conditions:
         (a) a reactant must have minimal permanent or inducible electrical dipolar characteristics as a result of the presence of pendant or bridging groups therein;
         (b) a reactant must impart a high degree of free volume to the polymer caused by inefficient chain packing therein in the solid state as a result of the presence of pendant or bridging groups therein; and
         (c) a reactant must have fluorine atoms chemically attached thereto; and
      (2) chemically combining equimolar quantities of the aromatic diamine and aromatic dianhydride reactants in a solvent to form a high molecular weight polyamic acid solution, and converting the high molecular weight polyamic acid to the corresponding low dielectric, high temperature linear aromatic polyimide.

2. The process of claim 1, wherein the high molecular weight polyamic acid solution is applied onto the surface of the substrate to form a polyamic acid film layer, and the applied polyamic acid film layer is then thermally cured to form a low dielectric, high temperature linear aromatic polyimide film layer which adheres to the substrate.

3. The process of claim 1, wherein:
   the high molecular weight polyamic acid solution is chemically imidized to produce a precipitate of the corresponding polyimide;
   the corresponding polyimide is then dissolved in a solvent, and a film layer prepared from the solution of the polyimide in the solvent is applied onto the surface of the substrate; and
   the film layer is subsequently heated to remove solvent and produce a high-temperature stable, low dielectric polyimide film layer which adheres to the substrate.

4. The process of claim 1, wherein a high degree of free volume is imparted to the polymer by selecting a monomeric reactant having a separator or linking group selected from the class consisting of ether, sulfide, or carbonyl.

5. The process of claim 1, wherein a high degree of free volume is imparted to the polymer forming meta linkages in the polymer structure.

6. The process of claim 1, wherein a high degree of free volume is imparted to the polymer by forming ortho linkages in the polymer structure.

7. The process of claim 1, wherein a high degree of free volume is imparted to the polymer by forming combinations of linkages in the polymer structure selected from the group consisting of meta-ortho, metapara, and ortho-para.

8. The process of claim 1, wherein the pendant or bridging groups are selected from the class consisting of alkyl, aryl, aryloxy, or aryl sulfide.

9. The process of claim 1, wherein fluorine atoms are chemically attached to a monomeric reactant in the form of groups selected from the class consisting of —CF$_3$ on —C(CF$_3$)$_2$.

10. The process of claim 1, wherein the aromatic diamine is selected from the group consisting of:
    2,2-bis[4(4-aminophenoxy)phenyl]hexafluoropropane,
    2,2-bis[4(3-aminophenoxy)phenyl]hexafluoropropane,
    1,3-bis( aminophenoxy)benzene,
    4,4-oxydianiline,
    2,2-bis(4-aminophenyl)hexafluoropropane,
    3,3'-oxdianiline,
    2,2-bis(3-aminophenyl)hexafluoropropane, and
    3,3-diaminodiphenylsulfone.

11. The process of claim 1, wherein the aromatic dianhydride is selected from the group consisting of:
    2,2-bis(3,4-dicarboxyphenyl)hexafluoropropane dianhydride,
    4,4'-oxydiphthalic anhydride, pyromellitic dianhydride,
    4,4'-bis(3,4-dicarboxyphenoxy)diphenyl sulfide dianhydride, and
    1,4-bis(3,4-dicarboxyphenonoxy)benzene dianhydride.

12. The process of claim 1, wherein the solvent is selected from the group consisting of:
    N, N-dimethylacetamide,
    N, N-dimethylformamide,
    N-methyl-2-pyrrolidone, and
    dimethylsulfoxide.

13. The process of claim 3, wherein the high molecular weight polyamic acid solution is chemically imidized by a process which comprises adding a solution of acetic anhydride and pyridine in an organic solvent to the high molecular weight polyamic acid solution.

14. The process of claim 3, wherein the solvent employed to dissolve the polyimide is selected from the group consisting of:
    N,N-dimethylacetamide,
    N,N-dimethylformamide,
    N-methyl-2-pyrrolidone,
    dimethylsulfoxide,
    chlorinated solvents,
    tetrahydrofuran,
    m-creasol,
    methylethyl ketone
    methylisobutyl ketone, and
    bis(2-methoxyethyl)ether.

15. The process of claim 3, wherein the polyimide precipitate is wash-blended in freshly distilled water and thoroughly dried prior to being dissolved in a solvent.

* * * * *